US006872794B2

(12) United States Patent
Zappettini et al.

(10) Patent No.: US 6,872,794 B2
(45) Date of Patent: Mar. 29, 2005

(54) NLO POLYMERS AND OPTICAL WAVEGUIDES BASED THEREON

(75) Inventors: Andrea Zappettini, Reggio Emilia (IT); Silvia Maria Pietralunga, Cassina de Pecchi (IT); Yuri Dubitsky, Milan (IT); Antonio Zaopo, Milan (IT); Mario Martinelli, San Donato Milanese (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 137 days.

(21) Appl. No.: 10/268,717

(22) Filed: Oct. 11, 2002

(65) Prior Publication Data

US 2003/0103759 A1 Jun. 5, 2003

(30) Foreign Application Priority Data

Oct. 15, 2001  (EP) ............................................ 01203889

(51) Int. Cl.$^7$ ................................................ C08F 12/04
(52) U.S. Cl. ........................ 526/346; 526/274; 526/286; 526/307.5
(58) Field of Search .............................. 526/346, 274, 526/286, 307.5; 524/481, 483; 428/690

(56) References Cited

U.S. PATENT DOCUMENTS

| 5,323,482 A | 6/1994 | Stewart et al. | |
| 2002/0076576 A1 * | 6/2002 | Li et al. | 428/690 |

FOREIGN PATENT DOCUMENTS

| JP | 06-179802 | * | 6/1994 |
| WO | WO 99/25081 | | 5/1999 |

OTHER PUBLICATIONS

Reinhardt, "The status of third–order polymeric nonlinear optical material" Trends in Polymer Science, 1(1), 4–9(1991).*
Nalwa, "Nonlinear optical properties of pi –conjugated materials" Handbook of Organic Conductive Molecules and Polymer, 4,309–363 (1997).*
Kurihara et al."Spectra of . . . in poly(2,5–dimethoxy p–phenylene vinylene)(MO–PPV) for various conversion levels" Chemical Physics Letters, 183(6), 534–538 (1991).*
M. Tarabia, et al., "Neutron and X–ray Reflectivity Studies of Self–assembled Heterostructures Based on Conjugated Polymers", *J. Applied Phys.*, vol. 83, No. 2, pp. 725–732, (1998).
Jeffrey H. Simpson, et al., "Solid–State $^{13}$C NMR Characterization of Annealed Poly(p–phenylene vinylene) PPV Films", *Journal of Polymer Science: Part B: Polymer Physics*, vol. 28, pp. 1859–1869, (1990).
Hong–Ku Shim, et al., "Synthesis and Electrical and Optical Properties of Poly–(2–methoxy–1,4–phenylenevinylene) and Copolymers", *Makromol. Chem.*, vol. 194, No. 4, pp. 1115–1124, (1993).
Bruce A. Reinhardt, "The Status of Third–order Polymeric Nonlinear Optical Materials: Directions and Philosophy of Polymer Research for Nonlinear Optics in the US Air Force Wright Laboratory", *Trends in Polymer Science*, vol. 1, No. 1, pp. 4–9, (1993).
J. Swiatkiewicz, et al., "Anisotropy of the Linear and Third–order Nonlinear Optical Properties of a Stretch–oriented Polymer Film of Poly–[2, 5–dimethoxyparaphenylenevinylene]", *Applied Physics Letters*, vol. 56, No. 10, pp. 892–894 (1990).
B. Buchalter, et al., "Third–order Optical Susceptibility of Glasses Determined by Third Harmonic Generation", *Applied Optics*, vol. 21, No. 17, (1982).
Takashi Kurihara, et al., "Spectra of $x^{(3)}$(–3ω; ω, ω ω) in poly(2,5–dimethoxy p–phenylene vinylene) (MO–PPV) for Various Conversion Levels", *Chemical Physics Letters*, vol. 183, No. 6, (1991).
K. Yushino, et al., "Photoconducting Composition", Patent Abstracts of Japan of JP 3146296 B2, (Pub. No. 06–179802), (Jun. 28, 1994).
H.S. Nalwa, "Nonlinear Optical Properties of π–Conjugated Materials", *Handbook of Organic Conductive Molecules and Polymers;* vol. 4, pp. 309–341 and 356–363, (1997).

* cited by examiner

*Primary Examiner*—Ling-Siu Choi
(74) *Attorney, Agent, or Firm*—Finnegan, Henderson, Farabow, Garrett & Dunner, L.L.P.

(57) ABSTRACT

The invention relates to new polymers useful in non linear optical (NLO) applications, particularly as optical waveguide materials.

6 Claims, 2 Drawing Sheets

NLO POLYMERS AND OPTICAL WAVEGUIDES BASED THEREON

CROSS REFERENCE TO RELATED APPLICATION

This application claims the right to priority on based European Patent Application No. 01203889.9 filed Oct. 15, 2001, the content of which is incorporated herein by reference.

BACKGROUND OF THE INVENTION

1. Field of the Invention

The present invention refers to nonlinear optics (NLO) polymers and optical waveguides based thereon.

2. Description of the Related Art

The deployment and growth in performance of optic communication systems take advantage of the possibility of directly switching and processing optical signals without recurring to conversion into electronic format followed by retransmission. In dependence on the physical mechanism adopted, the so called "all-optical switching" can provide speed of response, transparency to modulation formats and also simultaneous processing of multiple wavelengths, as in the case of wavelength-division multiplexed (WDM) signals. At the basis of all-optical processing of signals stands the possibility of affect at least one among the propagation parameters of an optical beam by means of a second optical beam. This means that either amplitude, or phase, or state of polarization of the beam to be processed are affected by a second light beam interacting with the first. It is well known that optical beams interact with each other within a material through optical nonlinear effects. In particular, the third order dielectric susceptibility of a material, represented by the coefficient $\chi^{(3)}(-\omega_4;\omega_1,\omega_2,\omega_3)$ is at the origin of third-order optical nonlinearities. In particular, when a pair of interacting optical beams are considered, a nonlinear variation of the refractive index in the material can be induced as proportional to Re $\chi^{(3)}(-\omega_s;\omega_p,-\omega_p,\omega_s)$, where the real part of the nonlinear susceptibility is considered and subscripts s and p indicate respectively the interacting signal and pump beams. This effect is named 'non-degenerate optical Kerr effect', and the corresponding nonlinearly induced dephasing is named 'cross-phase modulation (XPM)' and is such that $$\Delta\phi_s = \frac{2\pi}{\lambda_s} L \Delta n = \frac{2\pi}{\lambda_s} L n_2 I_p,$$

where $\lambda_s$ is the optical wavelength of the signal beam in vacuum, L is the effective interaction length, $$n_2 = \frac{3\mathrm{Re}\chi^{(3)}(-\omega_s;\omega_p,-\omega_p,\omega_s)}{4\varepsilon_0 c n^2}$$

is the Kerr coefficient expressed in $m^2 W^{-1}$, and $I_p$ is the intensity of the pump beam.

The Kerr-induced dephasing can be exploited to perform all-optical switching or processing of signals in an interferometric arrangement. This process is well established in literature, see for instance Kerr-induced switching in non-linear fiber loop mirrors (NLOM). One typical interferometric structure, used in optic communications is the Mach-Zehnder interferometer. In it a laser beam propagates in optical waveguides that are essentially channels of dielectric material surrounded by a cladding or substrate material having a lower index of refraction. The light beam originally propagates into one waveguide, which eventually splits into two dielectric paths, called 'arms'. The optical power is therefore divided between the arms and recombines at the end of them. If the beams propagating in the two arms undergo the same phase shift, corresponding to the 'balanced' case, constructive interference occurs in recombination and full optical power is transmitted. The existence of a dephasing between the two arms causes a transmission loss. If the dephasing amounts to $\pi$ radians, destructive interference occurs and no optical power is transmitted. The Mach-Zehnder interferometer is at the basis of integrated-optics electro-optical modulators. In this case, the waveguiding structure is realized in an electro-optical crystal and the dephasing between the arms is induced through the linear electro-optic effect, by suitably applying an electric voltage that causes a corresponding change in the refractive index.

The Mach-Zehnder structure can also be exploited all-optically, through the Kerr-induced XPM. In this case, an intensity modulated pump beam is forced into one of the arms of the interferometer, so that the refractive index in the same arm is accordingly modified and a phase unbalance is generated between the two arms. A suitable intensity modulation of pump beam is translated into phase modulation of the portion of signal beam in the activated arm and therefore into modulation of the unbalance and the transmitted signal intensity. If the unbalance of the interferometer is switched between zero and $\pi$ radians, an ON/OFF switching of the signal beam can be performed. An example of Kerr nonlinearity used for switching a Mach-Zehnder interferometer between ON and OFF transmission states is given in (EP97119344). In the application, the ON-OFF switching is used to impress intensity modulation on the signal. One major problem of the cited reference is that the application relies on the extremely low n2 value of silica-based optical fiber ($\chi^{(3)}=2.8\times10^{-14}$ esu leading to $n_2=2.3\times10^{-20}$ $cm^2W^{-1}$), so that a $\pi$ dephasing can be obtained at the expense of kilometric interaction length and this constitutes an obstacle to integration of the device in more complex processing structures.

In order to carry out relatively compact structures performing all-optical processing of signals through third-order nonlinearity, it is necessary to adopt optical materials which conjugate high $\chi^{(3)}$ values (at least $\chi^{(3)}=10^{-11}$ esu) with low absorption at the wavelengths of interest. In this way, interaction lengths in the cm or tens of cm range become sufficient. Moreover, the material to be used must be technologically processable, so that it enables to design and implement optical waveguides.

It is known, for instance from U.S. Pat. No. 5,323,482 and Tarabia et al. J. Appl. Phys. 83(2)1998, that organic compounds which possess a noncentrosymmetrical structure, in fact defined as nonlinear, can be used in nonlinear optics (NLO).

For instance (H. S. Nalwa, Handbook of Organic Conductive Molecules and Polymers, Vol. 4, 1997), π-conjugated polymers are suitable as they have a dual role by exhibiting large third-order $\chi^3$ coefficient and electrical conductivity values. It is therein reported that third-order NLO effects have been investigated in a variety of organic molecular and polymeric systems such as liquids, dyes, charge transfer complexes, π-conjugated polymers, NLO dye-grafted polymers, organometallic compounds, composites and liquid crystals. The importance of organic polymers has been realized with reference to large nonlinear optical properties, high optical damage thresholds, ultrafast optical responses, architectural flexibility and ease of fabrication. Third-order optical nonlinear values determined by for example THG, DFWM, and self-focusing techniques greatly differ from each other due to the distinct nonlinear optical processes and because of the applied experimental conditions such as the measurement wavelength and environmental conditions. Third-order optical nonlinearity values are often quoted as resonant and nonresonant values resulting from their wavelength dispersion within or far from the optical absorption regions of non linear materials. The resonant $\chi^3$ values can be several orders of magnitudes larger than that of the non resonant value.

For instance the aforementioned Tarabia et al. J.Appl. Phys. 83(2)1998 shows in particular that deuterated poly (phenylenevinylene) (D-PPV) are useful conjugated polymers for preparing self-assembled heterostructures with alternate different semiconducting layers having different dielectric constants.

However, one of the major problems to be solved regards the possibility of simultaneously reaching high $\chi^{(3)}$ values and low optical absorption. Since the interaction length, in the absence of dispersion, is ruled by absorption and an effective length is defined as $L=\alpha^{-1}$ where $\alpha$ is the linear absorption coefficient of the material.

SUMMARY OF THE INVENTION

The fundamental purpose of the present invention is to provide a polymeric material suitable to be used in waveguides for an entirely optical switch, having a high $\chi^3$ coefficient together with an absorption coefficient as low as possible.

For such purposes, the present invention provides NLO polymers having general formula (I):

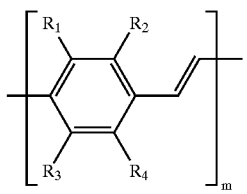

(I)

wherein: $R_1$; $R_2$; $R_3$; $R_4$ are independently selected from

—H; —$C_nD_{2n+1}$; —$OC_nD_{2n+1}$; —$SC_nD_{2n+1}$; —$SeC_nD_{2n+1}$; —$TeC_nD_{2n+1}$; —$N(C_nD_{2n+1})_2$; —$P(C_nD_{2n+1})_2$; —$Si(C_nD_{2n+1})_3$; —$Sn(C_nD_{2n+1})_3$; —$Ge(C_nD_{2n+})_3$; m=3–10,000 and n=1–50.

Preferred NLO polymers of general formula (I) are those wherein $R_2$, $R_3$ are H; $R_1$ $R_4$ are, independently selected from —$C_nD_{2n+1}$; —$OC_nD_{2n+1}$; —$SC_nD_{2n+}$; n=1–50, preferably 1–20; m=3–10,000, preferably 10–8,000.

In particular, the invention refers to a NLO polymer according to the above general formula characterized in that it is poly(1,4-dioctyloxy-2,5-phenylene vinylene)-$d_{34}$ having formula

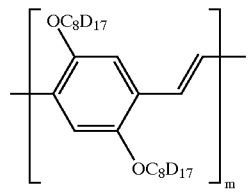

wherein m=3–10,000. Such polymer in the following will also be referred to as DO PPV($d_{34}$).

The invention also covers an optical waveguide characterized in that it comprises at least a NLO polymer according to the above general formula (I).

The polymers according to the present invention can be prepared by means of the following general reaction scheme:

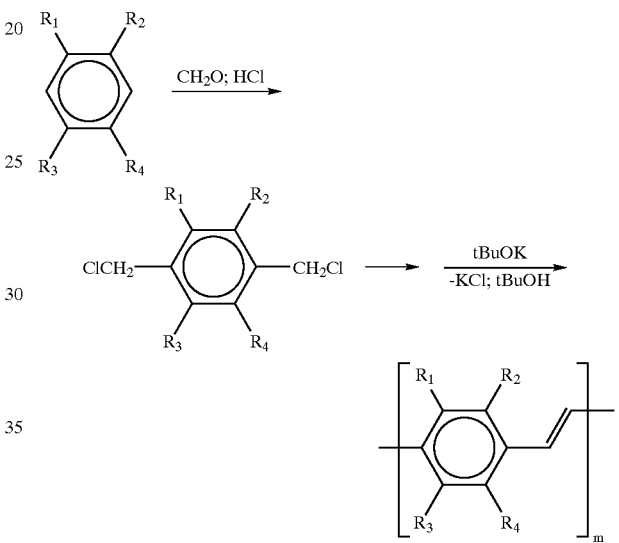

wherein:

$R_1$; $R_2$; $R_3$; $R_4$,=—H; —$C_nD_{2n+1}$; —$OC_nD_{2n+1}$; —$SC_nD_{2n+1}$; —$SeC_nD_{2n+1}$;

—$TeC_nD_{2n+1}$; —$N(C_nD_{2n+1})_2$; —$P(C_nD_{2n+1})_2$; —$Si(C_nD_{2n+1})_3$;

—$Sn(C_nD_{2n+1})_3$; —$Ge(C_nD_{2n+1})_3$ m=3–10,.000 and n=1–50.

Figure 1:
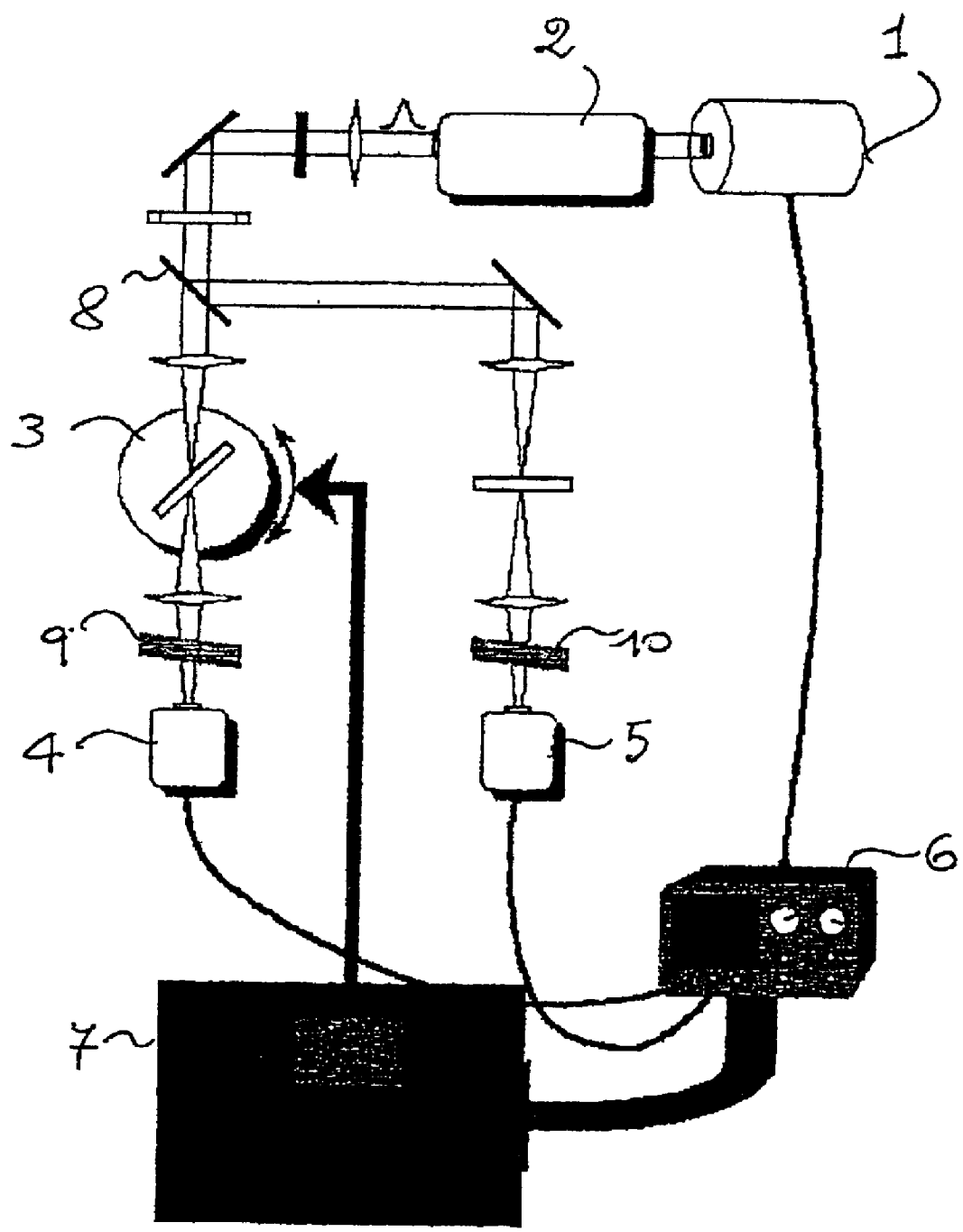
FIG. 1 shows a set up for Third Harmonic Generation Technique (THG).

The invention will be further disclosed hereinafter with reference to the following example, which does in no way limit the scope thereof.

EXAMPLE

Step 1

Preparation of 1,4-dioctyloxybenzene-$d_{34}$.

A solution of 4.4 g (40 mmole) of hydroquinone (99% Aldrich) in 50 mL of dry methanol was mixed under nitrogen with 1.5 M solution of sodium methoxide (2.1 equivalent) and refluxed for 20 min. After cooling the reaction mixture to room temperature, a solution of 17.7 g (2.1 equivalent) 1-bromooctane ($d_{17}$) (98% D; Aldrich) in 40 mL of dry methanol was added dropwise.

After refluxing for 16 hours, methanol was evaporated and the remaining mixture of white solid and brown oil was combined with 50 mL of ether, washed several times with 10% aqueous sodium hydroxide, water and dried over $Na_2SO_4$. After the solvent was evaporated, 9.7 g (71%) of a brown oil were obtained.

The analysis of the oil gave the following results:
$^1$H NMR (CDCl$_3$): δ 6.97 (4H, s, aromatic);
Elemental Analysis:
Calculated for $C_{22}D_{34}H_4O_2$: C, 71.74%; (D+H), 19.57%; O, 8.69%.
Found: C, 71.81%; (D+H), 19.45%; O, 8.74%.
Purity (GC) 96%.

Step 2
Preparation of 2,5-bis(chloromethyl)-1,4-dioctyloxybenzene-$d_{34}$.

A solution of 7.4 g (20 mmoles) of the compound prepared in Step 1 in 100 mL of dioxane was cooled to 0–5° C., and 17.5 mL of concentrated HCl and 9.7 mL of 37% aqueous formaldehyde solution were added.

Anhydrous HCl was bubbled through the solution for 30 minutes. Then the reaction mixture was stirred for 2 hours, further 9.7 mL of formaldehyde solution was added and HCl (gas) bubbled for 5–10 minutes at 0–5° C. After stirring at room temperature for 1 hour, such step was repeated 3 times, and the reaction mixture was stirred at room temperature for 16 hours. Finally the reaction mixture was refluxed for 3–4 hours.

After cooling and removing the solvent, a dark brown oil was obtained. The product was purified by preparative silica gel chromatography, using hexane-methylene chloride 9:1 mixture as eluent.

4.46 g (48%) of slightly yellow oil was obtained.
The analysis of the oil gave the following results:
$^1$H NMR (CDCl$_3$): δ 6.97 (2H, s, aromatic), 4.64 (4H, s, CH$_2$Cl);
Elemental Analysis:
Calculated for $C_{24}D_{34}H_6O_2Cl_2$: C, 61.94%; (D+H), 15.91%; O, 6.88%; Cl, 15.27%.
Found: C, 61.99%; (D+H), 15.87%; O, 6.91%.
Purity (GC) 98%.

Step 3
Polymerization—Preparation of poly(1,4-dioctyloxy-2,5-phenylene vinylene)-$d_{34}$ (DO-PPV)($d_{34}$).

To a solution of 2.79 g (6 mmoles) of 2,5-bis(chloromethyl)-1,4-dioctyloxybenzene ($d_{34}$) prepared in step 2 in 40 mL of anhydrous THF, a solution of 4.14 g (36 mmoles) of 95% potassium tert-butoxide solution in 80 mL of anhydrous THF was added dropwise at room temperature under stirring. The reaction mixture was stirred at room temperature for 24 hours. After such time the reaction mixture was poured into 1 L of methanol under stirring. The resulting red precipitate was washed with distilled water and reprecipitated from hot THF in methanol, dried under vacuum giving 1.2 g (51% yield).

The analysis of the product gave the following results:
UV (film on glass) 485 (nm).
IR (KBr plate) 615, 854, 965, 998, 1105, 1160, 1210, 1265, 1355, 1425, 1505, 1625, 2080, 2190 (cm$^{-1}$).
Elemental Analysis
Calculated for $C_{24}D_{34}H_4O_2$: C, 73.47%; (D+H), 18.37%; O, 8.16%.
Found: C, 73.41%; (D+H), 18.41%; O, 8.18%.
Inherent viscosity 8.4 dL/g in THF.

The above reactions of steps 1–3 are summarised in the following reaction scheme:

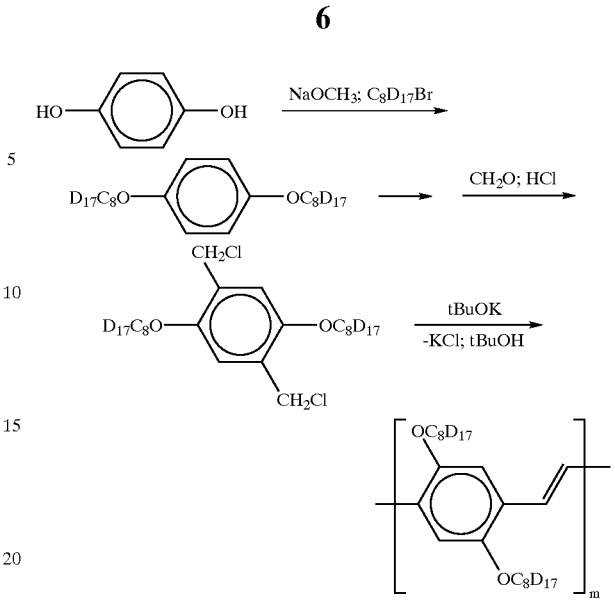

wherein m=3÷10,000

Characterization of the linear absorption of poly(1,4-dioctyloxy-2,5-phenylene vinylene)-$d_{34}$ (DO-PPV)($d_{34}$).

The absorbance of poly(1,4-dioctyloxy-2,5-phenylene vinylene) ($d_{34}$) (DO-PPV($d_{34}$)) spin-coated films at 1.5 μm was so low that it could not be evaluated by conventional spectrophotometers. The linear absorption of the material was measured dissolving the polymer in spectroscopic grade CS$_2$ (>99.9%, Riedel de Haën). The choice of CS$_2$ is due to the fact that poly(1,4-dioctyloxy-2,5-phenylene vinylene) ($d_{34}$) (DO-PPV($d_{34}$)) can be well dissolved in CS$_2$ and the absorption of CS$_2$ at 1.5 μm is low. The mass of both the polymer and the solution was measured with a weight scale Precisa 240A. The weight of the dissolved polymer was 0.0987 g and the weight of the solution was 19.9042 g. The solution was stirred and heated at 50° C. in order to completely dissolve the polymer. Then the solution was filtered with a 4 μm filter. The light source was a wavelength tunable laser source (Tunics 1550—Photonetics). The solution was poured in a 30 cm long optical cell equipped with two optical windows.

In order to determine the absorption thereof, the power of three beams was evaluated: the power of the beam impinging the optical cell (I0), the power of the reflected beam (IR) and the power of the transmitted beam (It).

In order to take into account the contribution of the solvent (CS$_2$) to the absorption, the absorption of CS$_2$ was measured with the same optical cell.

The results of the measurements are summarised in the following Table 1. For comparison purposes, in Table 1 absorption values are also reported for the following non-deuterated PPV derivative (MEH-PPV)

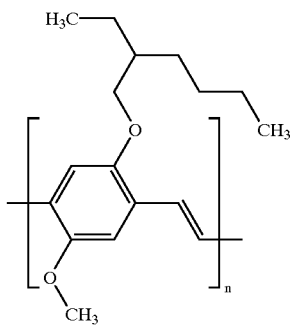

known in the art for LED applications.

TABLE 1

Experimental data relating to the absorption measurements and obtained absorption coefficients at λ = 1550 nm for DO PPV ($d_{34}$) of the invention in comparison with known MEH-PPV.

| | 10 (mW) | IR (mW) | It (mW) | α (cm$^{-1}$) |
|---|---|---|---|---|
| CS$_2$ + DO PPV ($d_{34}$) solution | 0.60 | 0.021 | 0.534 | 0.0015 |
| CS2 | | | | |
| DO PPV ($d_{34}$) | 0.60 | 0.021 | 0.556 | 0.00017 0.20 |
| CS$_2$ + MEH-PPV solution | 0.60 | 0.021 | 0.297 | 0.021 |
| MEH-PPV | | | | 3.02 |

The absorption coefficient of both the solution and the CS$_2$ was determined from the relation:

$$It = I0(1-R)^2 \exp(-\alpha L)$$

where R=IR/I0 and L is the cell length.

Assuming that there is no interaction between the polymer and the solvent, the absorption of the diluted polymer can be obtained from the relation:

$$\alpha_{diluted} = \alpha_{CS2+polymer} - \alpha_{CS2}$$

Then, the absorption of the polymer can be obtained from the relation:

$$\alpha_{polymer} = \alpha_{diluted}(W_{sol}/W_{polymer})(\rho_{polymer}/\rho_{CS2})$$

where for the density of CS$_2$ the value $\rho_{CS2}$=1.263 g/cm$^3$ is considered, and for the polymer ρ=1 is assumed (CRC Handbook of Chemistry and Physics, 79$^{th}$ Edition, CRC Press, p. 3–110).

By means of the tunable laser source, the polymer was tested in the 1500–1550 nm range. The maximum absorption coefficient was found to be 0.20 cm$^{-1}$ at 1550 nm. Characterization of the $\chi^3$ coefficient of poly(1,4-dioctyloxy-2,5-phenylene vinylene)-d$_{34}$ (DO-PPV)(d$_{34}$).

The third order nonlinear coefficient $\chi^3$ of poly(1,4-dioctyloxy-2,5-phenylene vinylene) (d$_{34}$) (DO-PPV(d$_{34}$)) films according to the invention was characterized by the Third Harmonic Generation Technique (THG).

The set up of such experiment is disclosed with reference to the enclosed schematic drawing of FIG. 1.

Referring to such drawing, a laser source (2) is an OPO (Master Optical Parametric Oscillator—Spectra Physics) pumped by the third harmonic of a Nd:Yag laser (1) (GCR 100, Spectra Physics). The OPO provides high power pulses at 10 Hz repetition rate, tunable in the range 400–2000 nm. The pulses are focused on samples, mounted on a step motor (3), whose rotation can be controlled down to ⅛ deg through a personal computer (7). A fraction of the pulse is stirred by a beam splitter (8) and focused on a non-linear medium. This second line is used for normalizing the power measured on the first line, thus taking into account laser fluctuations. The third harmonic power is collected by two visible photodiodes (4, 5) (Newfocus 1801) and read by an oscilloscope (Tektronix TDS 680B). A set of filters (9, 10) absorbs the fundamental beam. The measurement is carried out by comparing the THG signal produced by the sample and the THG signal produced by the quartz, which is taken as reference. Thus, the $\chi^3$ of the sample can be determined by the following relation (T. Kurihara, Y. Mori, T. Kaino, H. Murata, N. Takada, T. Tsutsui, S. Saito, Chemical Physics Letters, 183 (1991), p. 534–538):

$$\chi^3_{sample} = \frac{2}{\pi} \chi^3_{quartz} \frac{l_c^{quartz}}{L_{sample}} \sqrt{\frac{I_{3\omega(sample)}}{I_{3\omega(quartz)}}}$$

Where $L_{sample}$ is the film thickness, $l_c^{quartz}$ is the coherence length of the quartz, $I_{3\omega(sample)}$ and $I_{3\omega(quartz)}$ are the third harmonic powers generated by the sample and by the reference respectively. The $\chi^3$ of the sample is obtained taking for the quartz the value of 2.79×10$^{-14}$ esu (B. Buchalter, G. R. Meredith, Applied Optics, 21 (1982), p. 3221).

In this way, the $\chi^3$ of poly(1,4-dioctyloxy-2,5-phenylene vinylene) (d$_{34}$) (DO-PPV(d$_{34}$)) was measured and the value of 3.5×10$^{-11}$ esu was obtained for λ=1740 nm.

For comparison purposes, poly(1,4-dioctyloxy-2,5-phenylene vinylene) (DO-PPV, the non-deuterated homolog of DO-PPV(d$_{34}$)), was prepared according to the same reaction scheme and the $\chi^3$ value was determined according to the same method. For DO-PPV a value $\chi^3$ of 3.0×10$^{-11}$ esu at λ=1740 nm was determined.

The molecular weights of the repeating units for DO-PPV (d$_{34}$) and DO-PPV are the following:

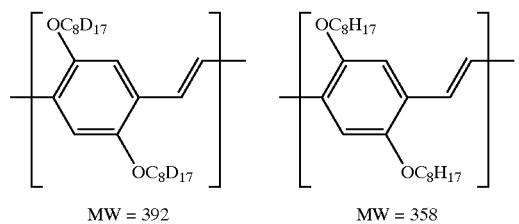

MW = 392          MW = 358

Taking into consideration that the molecular weight of the repeating unit of deuterated DO-PPV is 9.5% higher than that of non-deuterated DO-PPV, it can be theorically calculated that the $\chi^3$ value of the deuterated unit should be 9.5% lower than the non-deuterated one, i.e. should be about 2.7×10$^{-11}$ esu. However, as reported above, the experimentally measured $\chi^3$ value of deuterated DO-PPV, 3.5×10$^{-11}$ esu, is higher than that of non-deuterated polymer. Such experimental result is therefore totally unexpected and represents a surprising aspect of the present invention compared to the prior art.

Figure 2:
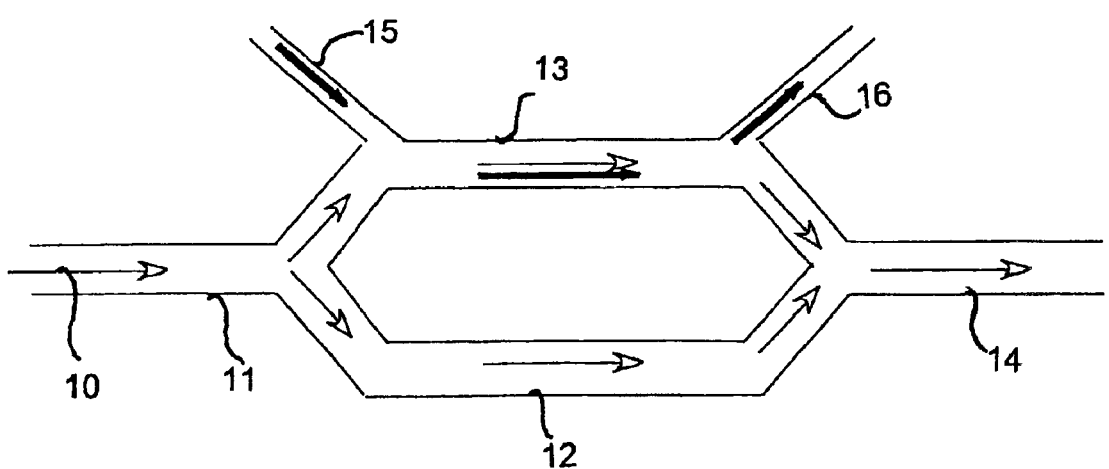
FIG. 2 shows a Mach-Zehnder interferometer in which a NLO polymer of the invention has been applied as an optical waveguide material.

FIG. 2 of the enclosed drawings schematically shows a Mach-Zehnder interferometer in which a NLO polymer of the invention has been applied as an optical waveguide material. According to such drawing, a signal beam 10 propagates in optical waveguides that are essentially channels of material surrounded by a cladding or substrate material having a lower index of refraction. The signal beam 10 originally propagates into one waveguide 11, which eventually splits into two paths 12 and 13, called 'arms'. The optical power is therefore divided between the arms and recombines at the end of them along 14. An intensity modulated pump beam 15 is forced into the arm 13 of the interferometer, so that the refractive index in the same arm is accordingly modified and a phase unbalance is generated between the two arms 12 and 13. Pump beam out is shown in 16.

A suitable intensity modulation of pump beam is translated into phase modulation of the portion of signal beam 10 in the activated arm 13 and therefore into modulation of the unbalance and the transmitted signal intensity. If the unbalance of the interferometer is switched between zero and π radians, an ON/OFF switching of the signal beam 10 can be performed at the output section 14.

What is claimed is:

1. An NLO polymer having the general formula

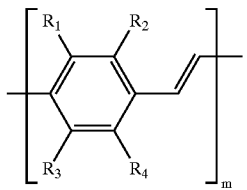

(I)

wherein: $R_1$; $R_2$; $R_3$; $R_4$ are independently selected from the group consisting of —H; —$C_nD_{2n+1}$; —$OC_nD_{2n+1}$; —$SC_nD_{2n+1}$; —$SeC_nD_{2n+1}$;
—$TeC_nD_{2n+1}$; —$N(C_nD_{2n+1})_2$; —$P(C_nD_{2n+1})_2$; —$Si(C_nD_{2n+1})_3$; —$Sn(C_nD_{2n+1})_3$; —$Ge(C_nD_{2n+1})_3$; and m=3–10,000 and n=1–50;

wherein at least one of $R_1$; $R_2$; $R_3$; and $R_4$ is a deuterated group.

2. The NLO polymer according to claim 1, wherein $R_2$, and $R_3$ are H; $R_1$, and $R_4$ are independently selected from —$C_nD_{2n+1}$, —$OC_nD_{2n+1}$, and —$SC_nD_{2n+1}$; and n=1–50, and m=3–10,000.

3. The NLO polymer according to claim 2, wherein the polymer is poly(1,4-dioctyloxy-2,5-phenylene vinylene)-$d_{34}$ having the formula

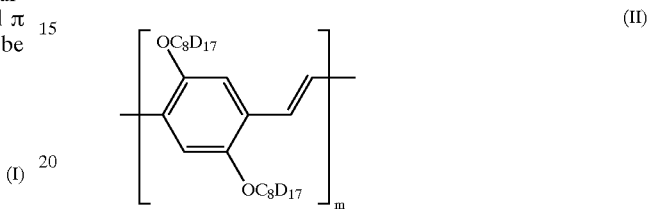

(II)

wherein m=3–10,000.

4. The NLO polymer according to claim 2, wherein n=1–20.

5. The NLO polymer according to claim 2, wherein m=10–8,000.

6. An optical waveguide comprising an NLO polymer according to any one of the preceding claims.

* * * * *

UNITED STATES PATENT AND TRADEMARK OFFICE
CERTIFICATE OF CORRECTION

PATENT NO. : 6,872,794 B2
DATED : March 29, 2005
INVENTOR(S) : Andrea Zappettini et al.

It is certified that error appears in the above-identified patent and that said Letters Patent is hereby corrected as shown below:

Column 10,
Line 2, after "-Sn($C_nD_{2n+1}$)$_3$;", insert -- and --.

Signed and Sealed this

Thirtieth Day of August, 2005

JON W. DUDAS
*Director of the United States Patent and Trademark Office*